United States Patent Office 3,487,078
Patented Dec. 30, 1969

3,487,078
IMPROVEMENTS IN OR RELATING TO DIBENZO-CYCLOHEPTANE COMPOUNDS
Ernst Jucker, Ettingen, Basel-Land, and Anton Ebnöther, Basel, Switzerland, assignors to Sandoz Ltd. (also known as Sandoz A.G.), Basel, Switzerland
No Drawing. Filed Nov. 7, 1961, Ser. No. 150,651
Claims priority, application Switzerland, Nov. 9, 1960, 12,546/60; Dec. 13, 1960, 13,905/60; Jan. 31, 1961, 1,122/61
Int. Cl. C07d *29/12, 27/28;* A61k *27/00*
U.S. Cl. 260—240       10 Claims

ABSTRACT OF THE DISCLOSURE

The present invention relates to new dibenzocycloheptane derivatives and to a process for their production.

---

The present invention provides compounds of the general Formula I,

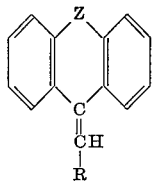

wherein R represents a radical selected from the group consisting of N-lower alkyl-piperidyl-(3)-, N-lower alkyl-pyrrolidyl-(3)-, N-lower alkyl-α-pipecolyl- and N-lower alkyl-pyrrolidyl-2-methyl- and Z represents a member selected from the group consisting of —CH=CH— and —CH$_2$—CH$_2$—, their acid addition salts and quaternary compounds. These compounds of Formula I have neuroplegic or antihistaminic properties.

The present invention also provides a process for the production of the compounds of the general Formula I, their acid addition salts and quaternary compounds, characterized in that water is split off from a 5-hydroxy derivative of the general Formula IV,

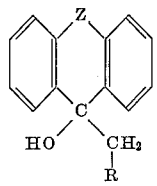

wherein R and Z have the above significance, and, when a quaternary compound or an acid addition salt is desired, quaternization or salification is effected.

The compound of the Formula IV may be produced by hydrolyzing a complex compound resulting from reacting a dibenzocycloheptane-5-one of the general Formula II,

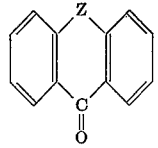

wherein Z has the above significance, with a metallo-organic compound of the general Formula III,

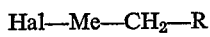

wherein R has the above significance, Me is a metal selected from the group consisting of magnesium and copper magnesium alloy, and Hal is a member selected from the group consisting of chlorine, bromine and iodine.

The compounds of the Formula I may be produced as follows:

A compound II, e.g. dibenzo[a,d]cyclohepta[1,4]diene-5-one or dibenzo[a,e]cycloheptatriene-5-one is added to a solution of the compound III, and the mixture heated until the reaction is complete. The reaction mixture is then hydrolysed in the cold with an aqueous ammonium chloride solution and extracted with a water-immiscible organic solvent, preferably chloroform. Compound IV obtained as an intermediate product may, if desired, be purified by crystallisation, and salification may be effected with an organic or inorganic acid. Compound IV may, however, be used directly as such.

The splitting off of water may, for example, be effected by heating compound IV dissolved in glacial acetic acid, with concentrated hydrochloric acid. It may, however, also be effected with other agents, e.g. phosphorus oxychloride, thionyl chloride or zinc chloride. The final product is isolated in accordance with known methods and purified and, if desired, acid addition salts and quaternary compounds are formed.

At room temperature, compounds I are either oily or crystalline. They are basic compounds which, at room temperature, form stable, crystalline salts with inorganic or organic acids, e.g. hydrochloric, hydrobromic, sulphuric, citric, oxalic, tartaric, succinic, maleic, acetic, benzoic, hexahydrobenzoic, methanesulphonic, fumaric, gallic and hydriodic.

Lower aliphatic alkyl halides or sulphates, (i.e. containing up to 6 carbon atoms in the molecule, e.g. methyl iodide, ethyl bromide or dimethyl sulphate may be used as agents in the production of the quaternary compounds.

Compounds I may be used as pharmaceuticals or as intermediates for the production of pharmaceuticals. At least some of them have histamine inhibiting, narcosis potentiating, adrenolytic, anticholinergic, sedative, antipyretic, antiemetic, serotonin inhibiting or hypothermic properties; the specific effect of any compound I depends upon the nature of the symbols X, Y, R$_1$, R$_2$ and Z.

5-{2'-[1″ - methyl - piperidyl-(2″)]-ethylidene} - dibenzo[a,d] cyclohepta[1,4]diene is a particularly good histamine-inhibitor and may be used in the treatment of allergies; the other exemplified compounds I have neuroplegic or antihistaminic properties.

In the following non-limitative examples all temperatures are stated in degrees centigrade, and the melting and boiling points are uncorrected.

EXAMPLE 1

5-{2'-[1″-methyl-piperidyl-(2″)]-ethylidene}-dibenzo[a,d]cyclohepta[1,4]diene (a) 2.8 g. of an activated copper-magnesium alloy (according to Gilman) are covered with a layer of 15 cc. of tetrahydrofuran and 0.4 cc. of ethylene bromide are added. Upon commencement of the reaction a solution of 16.2 g. of 1-methyl-piperidyl-(2)-ethyl chloride in 20 cc. of tetrahydrofuran are added dropwise within 20 minutes. After heating to the boil at reflux for 2 hours, a solution of 10.4 g. of dibenzo[a,d]cyclohepta[1,4]diene-5-one (melting point 34–35°) in 10 cc. of tetrahydrofuran are added at 50°. The mixture is then heated to the boil for a further hour. The cooled solution is then poured into 300 cc. of a 10% ammonium chloride solution. The metallic residues are filtered off, the filtrate shaken three times with chloroform and the combined chloroform extracts dried over potassium carbonate and the solution evaporated. The oily residue is taken up in 200 cc. of petroleum ether, the resin-like flakes filtered off, the filtrate concentrated and cooled to −20°. Upon standing for some time the 5-hydroxy-5-{2′-[1″-methyl-piperidyl - (2″)] - ethyl} - dibenzo[a,d]cyclohepta[1,4]diene, having a melting point of 116–118°, crystallises from the concentrated solution.

(b) The resulting compound is dissolved in 100 cc. of glacial acetic acid and 40 cc. of concentrated hydrochloric acid and heated to the boil at reflux for one hour. The solution is then concentrated in a vacuum, the residue dissolved in water, the aqueous solution made alkaline with potassium hydroxide and extracted with ether. The ether extract dried over potassium carbonate is separated from the solvent by distillation and the remaining oil distilled at a pressure of 0.01 mm. of Hg, the 5-{2′-[1″-methyl-piperidyl - (2″)]ethylidene} - dibenzo[a,d]cyclohepta[1,4]diene distilling over at an air bath temperature of 180–200°.

*Hydrobromide.*—Such a quantity of aqueous hydrobromic acid is added to the solution of the base in methanol that the solution becomes acid to Congo red indicator. After evaporation of the solution the residue is taken up in acetone and ether slowly added to the solution, the 5-{2′-[1″-methyl-piperidyl-(2″)]-ethylidene}-dibenzo[a,d]cyclohepta[1,4]diene-hydrobromide crystallising. After recrystallisation from ethanol/ether the compound melts at 189–190° (decomposition).

The iodo methylate is produced by reacting the solution of the base in absolute ethanol with the calculated quantity of methyl iodide. Melting point 228–230° (decomposition) from methanol.

EXAMPLE 2

5-{[1′-methyl-piperidyl-(3′)]-methylene}-dibenzo[a,d]cyclohepta[1,4]diene (a) 2.8 g. of an activated copper-magnesium alloy (according to Gilman) are covered with a layer of 15 cc. of tetrahydrofuran and 0.5 cc. of ethylene bromide added. As soon as vigorous reaction has started, a solution of 14.8 g. of 1-methyl-piperidyl-(3)-methyl chloride in 20 cc. of tetrahydrofuran are added dropwise. After heating at reflux for one and a half hours a solution of 10.4 g. of dibenzo[a,d]cyclohepta[1,4]diene-5-one (melting point 34–35°) in 10 cc. of tetrahydrofuran are added dropwise at 60° and the mixture then heated for a further two hours at reflux. The cooled solution is then poured into 300 cc. of a 10% ammonium chloride solution, stirred with chloroform, the metallic residues filtered off and the filtrate shaken with chloroform. After drying the chloroform extract over magnesium sulphate and evaporation of the solvent, crude 5-hydroxy-5-{[1′-methyl-piperidyl-(3′)]-methyl}-dibenzo[a,d]cyclohepta[1,4]diene is recrystallised from ethanol. Melting point 160–161°.

(b) The resulting compound is heated at reflux in 125 cc. of glacial acetic acid containing 50 cc. of concentrated hydrochloric acid for 90 minutes. The solution is then evaported in a vacuum and the residue dissolved in water. Upon cooling, the 5-{[1′-methyl-piperidyl-(3′)]-methylene}-dibenzo[a,d]cyclohepta[1,4]diene hydrochloride hydrate crystallises. It is recrystallised from water and acetone. Melting point 140–145° accompanied by giving off of the water of crystallisation.

EXAMPLE 3

5-{2′-[1″-methyl-piperidyl-(2″)]-ethylidene}-dibenzo[a,e]cycloheptatriene 2.8 g. of activated copper-magnesium alloy (according to Gilman) are covered with a layer of 15 cc. of tetrahydrofuran and 0.4 cc. of ethylene bromide added. Upon commencement of the reaction, a solution of 16.2 g. of 1-methyl-piperidyl-(2)-ethyl chloride in 20 cc. of tetrahydrofuran are added dropwise within 20 minutes. After heating for two hours at reflux, 10.3 g. of dibenzo[a,e]cycloheptatriene-5-one (melting point 89–90°) are added portionwise at 30° and the mixture heated at reflux for a further hour. The cooled solution is then poured into 300 cc. of a 10% ammonium chloride solution, stirred with chloroform, the metallic residues filtered off and the filtrate extracted three times with chloroform. After drying of the combined chloroform extracts over potassium carbonate and evaporation of the chloroform, the residue is rubbed with hexane. Undissolved brown flakes are filtered off over animal charcoal and the filtrate evaporated. The remaining viscous oil is heated at reflux with 125 cc. of glacial acetic acid and 50 cc. of concentrated hydrochloric acid for one hour. The resulting solution is then evaporated in a vacuum, the residue dissolved in water, the aqueous solution made alkaline with sodium hydroxide and the separated substance taken up in ether. The ether extract dried over potassium carbonate is separated from the solvent by distillation, the remaining oil dissolved in ethanol and the calculated quantity of fumaric acid added to the ethanolic solution.

The acid fumarate of the 5-{2′-[1″-methylpiperidyl-(2″)] - ethylidene} - dibenzo[a,e]cycloheptatriene crystallises upon addition of ether. After crystallisation from methanol, it melts at 188–190° (decomposition).

After crystallisation from methanol, the hydrobromide melts at 187–190° (decomposition).

EXAMPLE 4

5-{[1′-methyl-piperidyl-(3′)]-methylene}-dibenzo[a,e]cycloheptatriene (a) In a manner analogous to that described in Example 2, the Grignard compound is produced from 2.8 g. of a copper-magnesium alloy and 14.8 g. of 1-methyl-piperidyl-(3)-methyl chloride in 15 cc. of tetrahydrofuran. 10.3 g. of dibenzo[a,e]cycloheptatriene-5-one (M.P. 89–90° ) are then added portionwise to the Grignard compound at 30° and the mixture heated at reflux for one hour. The reaction mixture is then poured into 300 cc. of a 10% ammonium chloride solution, stirred with chloroform, the metallic residues filtered off and the solution shaken three times with chloroform. After drying of the purified chloroform extracts over potassium carbonate and evaporation of the chloroform, the residue is crystallised from acetone. 5 - hydroxy-5-{[1′-methyl-piperidyl-(3′)]-methyl}-dibenzo[a,e]cycloheptatriene melts at 144–145°.

(b) 13 g. of this compound are heated at reflux in 125 cc. of glacial acetic acid containing 50 cc. of concentrated hydrochloric acid for one hour. The solution is then evaporated in a vacuum and the residue crystallised from acetone/ether. After a further recrystallisation from acetone or ethanol/ether, the 5-{[1′-methyl-piperidyl-(3′)] - methylene} - dibenzo[a,e]cycloheptatriene hydrochloride melts at 237–239° (decomposition). The hydrochloride crystallises from water with water of crystallisation.

The base prepared from the hydrochloride by shaking with chloroform and sodium hydroxide crystallises from hexane or acetone in prisms having a melting point of 117–119°.

EXAMPLE 5

5-{2′-[1″-methyl-pyrrolidyl-(2″)]-ethylidene}-dibenzo[a,d]cyclohepta[1,4]diene (a) 1.3 g. of magnesium shavings activated with iodine are covered with a layer of 5 cc. of absolute tetrahydrofuran and 0.2 cc. of ethylene bromide are added. As soon as vigorous reaction has started, a solution of 8.9 g. of 1-methyl-pyrrolidyl-(2)-ethyl chloride in 10 cc. of tetrahydrofuran are added dropwise. After heating for 1½ hours at reflux, a solution of 10.4 g. of dibenzo[a,d]-cyclohepta[1,4]diene-5-one (melting point 34–35°) in 10 cc. of tetrahydrofuran is added dropwise at 50–60°. The mixture is heated at reflux for a further one and a half hours. The cooled solution is then poured into 150 cc. of a 10% ammonium chloride solution and shaken with chloroform. After drying of the chloroform extract over magnesium sulphate and evaporation of the solvent, the residue is recrystallised from acetone, the 5-hydroxy-5-{2'-[1" - methyl - pyrrolidyl - (2")] - ethyl} - dibenzo[a,d]-cycloheptа[1,4]diene being obtained in fine needles having a melting point of 115–117°.

(b) 9.4 g. of this compound are heated at reflux in 100 cc. of glacial acetic acid and 40 cc. of concentrated hydrochloric acid for one hour. The solution is then evaporated in a vacuum, the residue dissolved in water, the solution made alkaline and the separated product taken up in ether. After drying the ethereal solution over potassium carbonate and evaporation of the ether, the remaining oil is dissolved in methanol, the calculated quantity of hydrobromic acid added to the solution and the solution evaporated in a vacuum. The residue, 5-{2'-[1"-methyl-pyrrolidyl - (2")] - ethylidene}-dibenzo[a,d]cyclohepta[1,4]diene hydrobromide, is recrystallised from acetone. Melting point 151–153° (decomposition).

EXAMPLE 6

5-{2'-[1"-methyl-pyrrolidyl-(2")]-ethylidene}-dibenzo[a,e]cycloheptatriene (a) 5 - Hydroxy - 5 - {2' - [1" - methyl - pyrrolidyl-(2")] - ethyl} - dibenzo[a,e]cycloheptatriene is obtained from 8.9 g. of 1-methyl-pyrrolidyl-(2)-ethyl chloride and 10.3 g. of dibenzo[a,e]cycloheptatriene-5-one (melting point 89–90°) in a manner analogous to that described in Example 5. After recrystallisation from acetone, the compound melts at 129–131°.

(b) The splitting off of water from the 5-hydroxy derivative is also effected in a manner analogous to that described in Example 5. The 5-{2'-[1"-methyl-pyrrolidyl-(2")] - ethylidene} - dibenzo[a,e]cycloheptatriene hydrobromide melts at 164–166° (decomposition) after crystallisation from isopropanol/acetone.

EXAMPLE 7

5-{[1'-methyl-pyrrolidyl-(3')]-methylene}-dibenzo[a,d]cyclohepta[1,4]diene (a) 1.7 g. of magnesium shavings activated with iodine are covered with a layer of 5 cc. of absolute tetrahydrofuran and 0.2 cc. of ethylene bromide added. Upon commencement of the reaction, a solution of 10.7 g. of 1-methyl - pyrrolidyl - (3) - methyl chloride in 15 cc. of tetrahydrofuran is added dropwise. After heating at reflux for one hour, the solution of 13.5 g. of dibenzo[a,d]cyclohepta[1,4]diene-5-one in 15 cc. of tetrahydrofuran are added dropwise at 40°. The solution is then heated to the boil for a further two hours. The cooled reaction mixture is then poured into 150 cc. of a 10% ammonium chloride solution. The mixture is shaken a number of times with ether, the combined ether extracts dried over sodium sulphate and the solution evaporated. The residue is recrystallised from acetone, 5-hydroxy-5-{[1'-methyl-pyrrolidyl - (3')] - methyl} - dibenzo[a,d]cyclohepta[1,4]diene, having a melting point of 134–135°, resulting.

(b) 12 g. of the compound obtained in (a) above are heated to the boil at reflux with 100 cc. of glacial acetic acid containing 40 cc. of concentrated hydrochloric acid for one hour. The solution is then evaporated in a vacuum, the residue dissolved in water, the aqueous solution made alkaline and the separated substance taken up in ether. The oil resulting after drying over potassium carbonate and evaporation of the solvent is dissolved in 30 cc. of ethanol and 2.2 g. of fumaric acid added to the solution. The mixture is dissolved by heating for a short time, and then cooled, the neutral fumarate of 5-{[1'-methyl - pyrrolidyl - (3')] - methylene} - dibenzo[a,d]cyclohepta[1,4]diene crystallising. It is recrystallised twice from methanol/ethanol. Melting point 194–196° (decomposition).

EXAMPLE 8

5 - {[1' - methyl - pyrrolidyl - (3')] - methylene}-dibenzo[a,e]cycloheptatriene 13.4 g. of dibenzo[a,e]cycloheptatriene - 5 - one are added portionwise at 30° to a Grignard solution prepared in a manner analogous to that described in the previous example from 1.7 g. of magnesium shavings, 10.7 g. of 1 - methyl - pyrrolidyl - (3) - methyl chloride and 20 cc. of tetrahydrofuran. 10 cc. of tetrahydrofuran are then added and the mixture heated at reflux for 2 hours. The cooled reaction mixture is then poured into 150 cc. of a 10% ammonium chloride solution. The mixture is shaken a number of times with ether, the combined ether extracts dried over sodium sulphate and the solution evaporated. The remaining oily residue is heated to the boil at reflux with 200 cc. of glacial acetic acid containing 80 cc. of concentrated hydrochloric acid for one hour. The solution is then evaporated in a vacuum, the viscous residue dissolved in water and shaken with ether. The aqueous phase is made alkaline and the separated oil taken up in ether. The ether extract is dried over potassium carbonate, the solvent evaporated and the viscous oil distilled in a high vacuum. The yellow, viscous oil distilling off at a bath temperature of 150–180° and at a pressure of 0.05 mm. of Hg is dissolved in 40 cc. of ethanol and 2.36 g. of fumaric acid added to the solution. The mixture is dissolved by heating for a short time and upon cooling the neutral fumarate of 5-{[1'-methyl pyrrolidyl - (3')] - methylene} - dibenzo[a,e]cycloheptatriene crystallises. It is recrystallised twice from methanol/ethanol. Melting point 202–204° (decomposition).

Having thus disclosed the invention, what is claimed is:

1. A member of the class consisting of dibenzocycloheptane derivatives of the general Formula I,

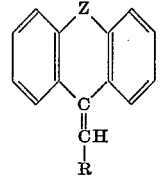

I their acid addition salts and quaternary compounds, wherein R represents a radical selected from the group consisting of N-lower alkyl-piperidyl-(3)-, N-lower alkyl-pyrrolidyl-(3)-, N-lower alkyl-α-pipecolyl- and N-lower alkyl-pyrrolidyl-2-methyl- and Z represents a member selected from the group consisting of —CH=CH— and —CH$_2$—CH$_2$—.

2. 5 - {2' - [1" - methyl - piperidyl - (2")] - ethylidene} - dibenzo[a,d]cyclohepta[1,4]diene.

3. 5 - {[1' - methyl - piperidyl - (3')] - methylidene}-dibenzo[a,d]cyclohepta[1,4]diene.

4. 5 - {2' - [1" - methyl - piperidyl - (2")] - ethylidene} - dibenzo[a,e]cycloheptatriene.

5. 5 - {[1' - methyl - piperidyl - (3')] - methylidene}-dibenzo[a,e]cycloheptatriene.

6. 5 - {2' - [1" - methyl - pyrrolidyl - (2")] - ethylidene} - dibenzo[a,d]diene.

7. 5 - {2' - [1" - methyl - pyrrolidyl - (2")] - ethylidene} - dibenzo[a,e]cycloheptatriene.

8. 5 - {[1' - methyl - pyrrolidyl - (3')] - methylidene}-dibenzo[a,d]cyclohepta[1,4]diene.

9. 5 - {[1' - methyl - pyrrolidyl - (3')] - methylidene}-dibenzo[a,e]cycloheptatriene.

10. A compound selected from the group which consists of:
(A) the compound of the formula:

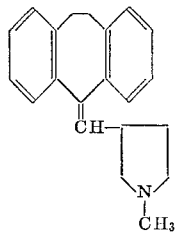

and
(B) its therapeutically acceptable non-toxic acid addition salts.

References Cited

UNITED STATES PATENTS

| | | | |
|---|---|---|---|
| 3,358,026 | 12/1967 | Schroter et al. | 260—240 XR |
| 3,409,640 | 11/1968 | Villani | 260—570.8 |
| 2,985,660 | 5/1961 | Judd et al. | 260—293 |
| 3,014,911 | 12/1961 | Engelhardt | 260—293 |
| 3,055,888 | 9/1962 | Renz et al. | 260—240 |

FOREIGN PATENTS

| | | |
|---|---|---|
| 1,109,166 | 6/1961 | Belgium. |
| 587,479 | 12/1969 | Puerto Rico(U.S.A.) |

OTHER REFERENCES

Bourquin et al. Helv. Chim. Acta, vol. 41, pp. 1072 to 1077, 1958.

JOHN D. RANDOLPH, Primary Examiner

U.S. Cl. X.R.

260—294.7, 326.5, 999